US008946934B2

(12) United States Patent
Butts et al.

(10) Patent No.: US 8,946,934 B2
(45) Date of Patent: Feb. 3, 2015

(54) LOW-COST CONNECTOR APPARATUS AND METHODS FOR USE IN HIGH-SPEED DATA APPLICATIONS

(75) Inventors: Lawrence Dale Butts, Shelby Township, MI (US); Robert E. Fust, Rochester, MI (US); George Marc Simmel, Carlsbad, CA (US)

(73) Assignee: Autosplice, Inc., San Diego, CA (US)

(*) Notice: Subject to any disclaimer, the term of this patent is extended or adjusted under 35 U.S.C. 154(b) by 1034 days.

(21) Appl. No.: 12/317,387

(22) Filed: Dec. 22, 2008

(65) Prior Publication Data

US 2009/0220013 A1 Sep. 3, 2009

Related U.S. Application Data

(60) Provisional application No. 61/009,450, filed on Dec. 28, 2007.

(51) Int. Cl.

| | |
|---|---|
| ***H04B 3/00*** | (2006.01) |
| ***H01R 24/42*** | (2011.01) |
| ***H01R 13/6581*** | (2011.01) |
| ***H01R 13/66*** | (2006.01) |
| ***H01R 13/719*** | (2011.01) |
| *H01R 24/52* | (2011.01) |

(52) U.S. Cl.

CPC ............ *H01R 24/42* (2013.01); *H01R 13/6581* (2013.01); *H01R 13/6658* (2013.01); *H01R 13/719* (2013.01); *H01R 24/52* (2013.01)

USPC ............................................................ 307/91

(58) Field of Classification Search

USPC ......... 307/91; 439/63, 394, 578, 580, 620.03, 439/944, 497, 620.21, 607.44; 174/68.1, 174/350; 361/816

See application file for complete search history.

(56) References Cited

U.S. PATENT DOCUMENTS

| | | | | | |
|---|---|---|---|---|---|
| 4,319,288 | A | | 3/1982 | Lee | |
| 4,533,191 | A | | 8/1985 | Blackwood | |
| 4,881,912 | A | | 11/1989 | Thommen et al. | |
| 4,898,545 | A | * | 2/1990 | Endo et al. | 439/578 |
| 5,303,266 | A | * | 4/1994 | Budin et al. | 375/257 |
| 5,402,088 | A | * | 3/1995 | Pierro et al. | 333/33 |
| 5,587,884 | A | | 12/1996 | Raman | |
| 5,681,173 | A | * | 10/1997 | Northey et al. | 439/108 |
| 5,876,247 | A | | 3/1999 | Hashimoto | |
| 6,030,343 | A | * | 2/2000 | Chechersky et al. | 600/399 |
| 6,049,823 | A | | 4/2000 | Hwang | |

(Continued)

FOREIGN PATENT DOCUMENTS

DE 20 2004 012 318 U1 1/2006

*Primary Examiner* — Fritz M Fleming

(74) *Attorney, Agent, or Firm* — Gazdzinski & Associates, PC

(57) ABSTRACT

Low-cost connector apparatus for passing electrical signals from one device over another via a cable. In one embodiment, the connector apparatus comprises a coaxial type connector that mates with a host device, such as via the motherboard thereof. In one variant, the connector further comprises a plurality of electrical components including an integrated circuit adapted to condition (e.g., equalize) the signals being transmitted over the cable. The connector (and hence internal electrical components) is shielded so as to mitigate the effects of EMI or RFI on the host device circuitry itself. In another variant, the signals comprise IEEE-Std. 1394 "FireWire" high speed data signals, and the use of the shielded connector in the signal pathway allows the use of lower cost cabling than would otherwise be required with a non-shielded (non-integrated) connector.

17 Claims, 10 Drawing Sheets

(56) References Cited

U.S. PATENT DOCUMENTS

| | | | | |
|---|---|---|---|---|
| 6,234,847 | B1 | 5/2001 | Chang | |
| 6,328,603 | B1 | 12/2001 | Chang | |
| 6,502,997 | B1 | 1/2003 | Lee et al. | |
| 6,824,403 | B2 | 11/2004 | Hall et al. | |
| 6,955,564 | B2 | 10/2005 | Cho et al. | |
| 7,033,210 | B1 | 4/2006 | Laurer et al. | |
| 7,772,496 | B2 * | 8/2010 | Morijiri | 174/117 R |
| 2005/0039217 | A1 * | 2/2005 | Abe et al. | 725/111 |
| 2005/0106938 | A1 * | 5/2005 | Nishio et al. | 439/607 |

* cited by examiner

LOW-COST CONNECTOR APPARATUS AND METHODS FOR USE IN HIGH-SPEED DATA APPLICATIONS

PRIORITY

This application claims priority to U.S. provisional patent application Ser. No. 61/009,450 filed Dec. 28, 2007 entitled "CONNECTOR APPARATUS AND METHODS", which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates generally to electrical connectors and signal transfer, and more particularly in one exemplary aspect to substantially compact and unified connector apparatus for transferring high-speed data signals (and optionally power), and methods of operating and manufacturing the same.

DESCRIPTION OF RELATED ART

In the case of automotive or vehicle applications (such as e.g., back-up cameras, video displays such as LCDs, and radio antennas), two solutions are available under the prior art to support the use of high-speed data connections (such as IEEE Std. 1394, aka "FireWire) within applications such as vehicles: (i) fiber optic, and (ii) twisted shielded pair (TSP) cabling.

Under the fiber optic approach, a Plastic Optical Fiber (POF) is used as the medium to transmit the (e.g., 1394) signal. Since 1394 is "bilingual" or bi-directional, this requires two fibers to be run to each device. POF is not serviceable, and requires point-to-point routing. Inline connectors severely affect the performance of POF in many applications such as automobiles due to alignment issues that are caused by vibration, temperature and mechanical alignment of the POF in the connector. Minimum bend radii for POF is typically >25 mm, which is very difficult to package in automotive applications which often require smaller radii. Moreover, automotive POF is limited in the maximal length of the fibers.

Transceivers utilize Fiber Optical Transmitters (FOT), the latter which are used to convert the optical signal from the POF to electrical pulse signals on the device. Such FOTs inherently produce EMI (noise), and are sensitive to temperatures that occur in automotive applications.

Additionally, the aforementioned POF is susceptible to installation and repair-induced damage, such as when the vehicle is manufactured, or is serviced and must have some of this POF removed for access or replacement of components.

Under the twisted shielded pair approach, two sets of shielded twisted pair conductors are used with an overall braid to reduce susceptibility of the cable to EMI/EMC generated from other functions in the vehicle such as the ignition system, electric motors such as fuel pumps, window motors, windshield wiper motors, or even external sources. These cables are comparatively large in diameter (4.5 mm), again requiring large bend radii (typically >25 mm). They are also comparatively expensive due to their relatively complex construction and precision requirements.

Similarly, in the "commercial" (e.g., home entertainment, enterprise, consumer) arena, similar solutions are available to support the use of IEEE Std. 1394 applications in the user's premises. The fiber optic solution is costly, and requires that the premises be wired with POF throughout to support the 1394 capability. In addition to added cost, this often requires added care in the routing of the cable as with the aforementioned automotive applications (so as to avoid incidental nicks or other damage which can significantly affect fiber optic performance), and components at either end of the cable.

The use of twisted pair and coaxial cables to transmit data and signals for entertainment and information is well known and understood. The twisted shielded pair approach requires the use of two sets of shielded twisted pair with an overall braid to reduce susceptibility of the cable to EMI/EMC from other appliances in the home that may potentially produce EMI or noise (e.g., Wi-Fi, Bluetooth, WiMAX, or other wireless devices, microwave ovens, televisions, blenders/handheld appliances, refrigerators, vacuum cleaners, etc.).

To date, bandwidth requirements have been sufficiently low so as to allow acceptable service from relatively low-cost cable and connectors. However, with the introduction of High Definition (HD) Television, digital music and the ability to access sources of content for these devices on-demand, improvements to the infrastructure (primarily the existing cables) is required for acceptable performance. Many applications have used expensive Optical Fiber in place of copper cables due to its superior bandwidth and natural immunity to EMI/RFI noise. Alternatively, TSPs or "quads" (quad twisted shielded pair cables) may be able to provide sufficient EMI/RFI suppression and bandwidth, but are very costly and generally not part of the installed cabling base in premises.

Hence, improved apparatus and methods are needed that address one or more of the foregoing issues; i.e., (i) cost; (ii) minimal bend radii; (iii) sufficient EMI/EMC performance; (iv) sufficiently high bandwidth capability so as to support current and next-generation high-definition and similar technologies; and (v) "robustness" to the installation environment.

SUMMARY OF THE INVENTION

The present invention addresses the foregoing deficiencies in the prior art by providing, inter alia, improved apparatus and methods for signal conduction and connection.

In a first aspect of the invention, an improved connector apparatus is disclosed. In one embodiment, the connector comprises a connector adapted for mating with a cable and an electronic device.

In a second embodiment, the connector is adapted for mating with a coaxial cable and adapted for providing a high-speed signal interface between said cable and an electronic device, and comprises: a coaxial cable connector; a connector housing comprising a noise shield and a substantially shielded volume formed therein; and an integrated circuit in signal communication with said connector and disposed substantially within said shielded volume, said integrated circuit adapted to provide at least one signal conditioning function. The shield is adapted to mitigate at least noise radiated from said integrated circuit and at least one other electronic component disposed within said shielded volume.

In one variant, the high-speed interface comprises an interface compliant with IEEE Std. 1394.

In another variant, the connector is compliant with at least one of a FAKRA or USCAR standard.

In still another variant, the integrated circuit comprises an equalizer circuit adapted to perform at least spectral shaping, and is further adapted to perform signal filtering. The high-speed interface comprises an interface compliant with IEEE Std. 1394, and the connector is compliant with at least one of a FAKRA or USCAR standard.

In yet another variant, the coaxial connector comprises a coaxial connector adapted for use with an RG6U or RG59 or RG174 coaxial cable.

In still another variant, the coaxial connector comprises a coaxial connector adapted for use with a ribbon-type coaxial cable.

In another variant, the noise shield is formed using a plating or vapor deposition process.

In yet another embodiment, the connector apparatus comprises: a coaxial connector; signal conditioning apparatus in signal communication with the coaxial connector; and a plurality of terminals adapted for interface with a host electronic device. The connector is configured to provide a high-speed serialized bus protocol interface using a generic cable not particularly adapted for use with the protocol.

In one variant, the protocol comprises an IEEE Std. 1394 protocol, and the cable comprises an IEEE Std. 1394-compliant cable.

In another variant, the plurality of pins comprises three pins and the three pins comprise transmit, receive and ground terminals, respectively.

In another variant, the configuration to provide a high-speed serialized bus protocol interface comprises the signal conditioning apparatus performing at least one of: (i) spectral shaping, and (ii) filtering, of the high-speed serialized bus protocol signals.

In another variant, the connector apparatus further comprises a noise shield disposed over at least a portion of the connector apparatus, the noise shield and the signal conditioning apparatus cooperating to permit use of the generic cable while still meeting signal noise requirements of the protocol.

In yet another variant, the cable not particularly adapted for use with the protocol comprises an RG-type coaxial cable.

In a second aspect of the invention, a shielded connector adapted for mating with a cable and comprising electronic components is disclosed.

In a third aspect of the invention, a method of manufacturing a shielded connector comprising internal circuitry and adapted for mating with a cable is disclosed.

In a fourth aspect of the invention, a method of reducing the degree of modification required to an electronic device in order to accommodate a standardized signal interface is disclosed.

In a fifth aspect of the invention, a shielded connector adapted for mating with a coaxial cable is disclosed. In one embodiment, the connector is adapted for providing an IEEE Std. 1394-compliant interface between the cable and an electronic device, the connector comprising an integrated circuit disposed substantially within a shielded volume of the connector, the shielding being provided substantially by an external noise shield, the integrated circuit adapted to provide at least one signal conditioning function, the shield adapted to mitigate at least noise radiated from the integrated circuit and at least one other electronic component disposed within the shielded volume.

In one variant, the connector is compliant with at least one of the FAKRA or USCAR standards.

In a sixth aspect of the invention, a shield for use on a connector adapted to provide a high-speed signal interface is disclosed.

In one variant, the shield is formed using a plating process.

In another variant, the shield is formed using a vapor deposition process.

In yet another variant, the shield is formed substantially on the interior surfaces of a housing of the connector.

In a seventh aspect of the invention, a method of reducing the degree of modification required to an electronic device in order to accommodate a standardized signal interface is disclosed.

In an eighth aspect of the invention, a method of allowing for the use of lower cost components as part of implementing a signal interface comprising shielding a plurality of electronic components associated with the interface within a connector is disclosed.

In a ninth aspect of the invention, a method of reducing the electromagnetic or radio frequency interference in an electronic device having a signal interface is disclosed. In one embodiment, the method comprises integrating a plurality of electronic components associated with the interface within a shielded connector.

In a tenth aspect, connector apparatus adapted to provide a high-speed serialized bus protocol interface is disclosed. In one embodiment, the interface may be implemented without having to use a cable particularly adapted for use with the protocol. In one variant, the protocol comprises the FireWire protocol, and the cable comprises a FireWire cable.

In an eleventh aspect, a method of maintaining a vehicle is disclosed. In one embodiment, the vehicle comprises a high-speed serialized signal interface and an optical fiber carrying high-speed serialized signals to or from the interface from or to another device, respectively, and the method comprises: removing the optical fiber and interface from the vehicle; installing a shielded and signal-enhanced connector apparatus in place of the interface; and installing a coaxial cable in place of the optical fiber, the coaxial cable being coupled to the connector apparatus.

In one variant, the installing a coaxial cable comprises installing a cable that is both lower in cost and more mechanically rugged than the optical fiber.

In another variant, the act of carrying high-speed serialized signals comprises carrying signals that are transmitted according to a standardized high-speed serialized data protocol, and the coaxial cable coupled with the shielded and signal-enhanced connector meets signal noise requirements associated with the standardized protocol.

In still another variant, the standardized high-speed serialized data protocol comprises a protocol compliant with IEEE Std. 1394, the operating the connector apparatus comprising at least one of: (i) spectral shaping, and (ii) filtering, of the acts of installing the connector apparatus and the coaxial cable comprise installing connector apparatus and coaxial cable compliant with at least one of a FAKRA or USCAR standard.

In yet another variant, the method further comprises operating the connector apparatus and coaxial cable to carry high-speed serialized data signals, the operating the connector apparatus comprising at least one of: (i) spectral shaping, and (ii) filtering, of the data signals.

In a twelfth aspect of the invention a premises electronic apparatus is disclosed. In one embodiment, the premises electronic apparatus comprises: a host device having at least one circuit-carrying substrate; and connector apparatus, the connector apparatus comprising: a coaxial connector; signal conditioning apparatus in signal communication with the coaxial connector; and a plurality of terminals adapted for interface with the circuit-carrying substrate of the host device. The connector is configured to provide a high-speed bus protocol interface for the host device using a generic cable, the cable: (i) not particularly adapted for use with the protocol, and (ii) being installed at time of construction of the premises.

In one variant, the configuration to provide a high-speed bus protocol interface comprises the signal conditioning apparatus performing at least one of: (i) spectral shaping, and (ii) filtering, of the high-speed serialized bus protocol signals.

In another variant, the cable not particularly adapted for use with the protocol and installed at time of construction comprises an RG6U or RG59 coaxial cable routed at least partly within one or more walls of the premises.

In still another variant, the connector apparatus further comprises a housing within which at least a portion of the signal conditioning apparatus is disposed.

In another variant, the premises apparatus further comprises a noise shield disposed proximate at least a portion of the housing of the connector apparatus. The signal conditioning apparatus and the noise shield cooperate to allow for use of the not particularly adapted cable, and impose no additional shielding requirements within, or use of space on the substrate of, the host device.

In still yet another variant, the premises apparatus further comprises a noise shield disposed proximate at least a portion of the housing of the connector apparatus; and the signal conditioning apparatus and the noise shield cooperate to allow for use of the not particularly adapted cable, and impose no design changes or requirements over those associated with use of: (i) a coaxial connector apparatus without the signal conditioning apparatus, and (i) a cable particularly adapted for use with the protocol.

In a thirteenth aspect of the invention, a method of operating an electronic device is disclosed. In one embodiment of operating an electronic device, the device being adapted to carry high-speed data signals, the method comprises: installing a noise-susceptible cable to carry the signals to the device; transmitting the signals over the cable, the signals being at least partly interfered with by electronic noise; and receiving the at least partly interfered-with signals at a connector; conditioning the at least partly interfered-with signals within the connector to at least partly mitigate the effects of the electronic noise interference; and passing the conditioned signals to the electronic device for further use.

In one variant, the connector comprises a shielded volume, and the act of conditioning is performed substantially within the shielded volume.

In another variant, the installing a noise-susceptible cable comprises installing a coaxial cable that is not particularly adapted for use with, and does not meet the noise-susceptibility requirements of, a standardized protocol associated with, the high-speed data signals.

In still another variant, the standardized protocol comprises an IEEE Std. 1394 protocol.

BRIEF DESCRIPTION OF THE DRAWINGS

The features, objectives, and advantages of the invention will become more apparent from the detailed description set forth below when taken in conjunction with the drawings, wherein.

DETAILED DESCRIPTION OF THE INVENTION

Figure 1:
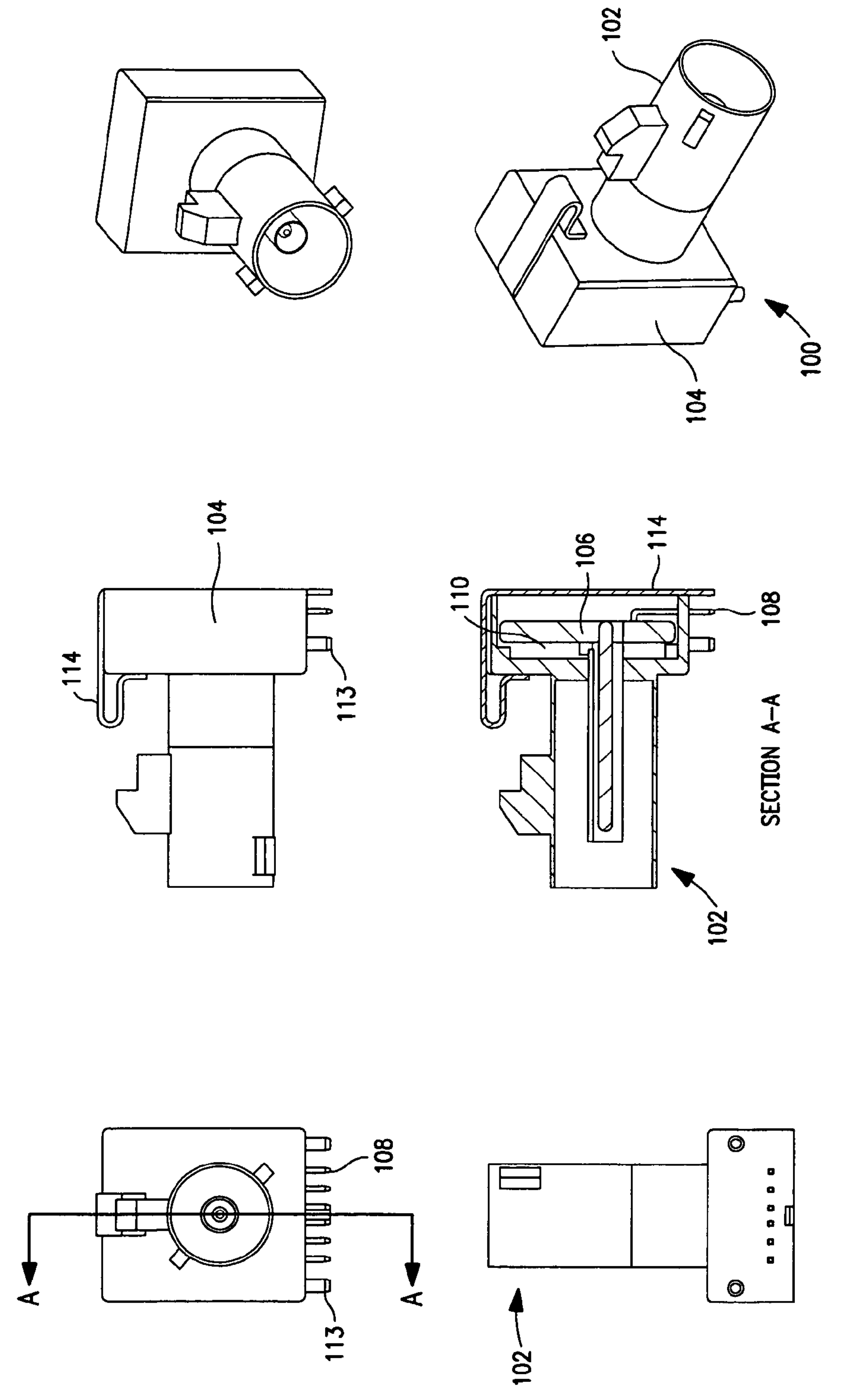
FIG. 1 is a composite view of a first exemplary embodiment of a connector apparatus according to the present invention, showing various aspects and views thereof.

Reference is now made to the drawings wherein like numerals refer to like parts throughout.

As used herein, the terms "client device", "peripheral device" and "end user device" include, but are not limited to, personal computers (PCs) and minicomputers, whether desktop, laptop, or otherwise, set-top boxes, personal digital assistants (PDAs) such as the "Palm®" or Blackberry families of devices, handheld computers, personal communicators, personal media devices (PMDs), J2ME equipped devices, cellular telephones or smartphones, or literally any other device capable of interchanging data with a network.

As used herein the term "coaxial cable" refers without limitation to any cable or interface having a substantially coaxial conductor or shield arrangement including for example RG-6/U, RG-6/UQ, RG-8/U, RG-9/U, RG-11/U, RG-58/U, RG-59/U, RG-62/U, RG-62A, RG-174/U, RG-178/U RG-179/U, RG-213/U, RG-214, RG-218, RG-223, and RG-316/U. See, inter alia, Appendix I hereto—Exemplary Coaxial Cable/Connector Types.

As used herein, the term "digital processor" is meant generally to include all types of digital processing devices including, without limitation, digital signal processors (DSPs), reduced instruction set computers (RISC), general-purpose (CISC) processors, microprocessors, gate arrays (e.g., FPGAs), Reconfigurable Compute Fabrics (RCFs), and application-specific integrated circuits (ASICs). Such digital processors may be contained on a single unitary IC die, or distributed across multiple components.

As used herein, the terms "electrical component" and "electronic component" are used interchangeably and refer to components adapted to provide some electrical function, including without limitation inductive reactors ("choke coils"), transformers, filters, gapped core toroids, inductors, capacitors, resistors, operational amplifiers, and diodes, whether discrete components or integrated circuits, whether alone or in combination. As used herein, the term "signal conditioning" or "conditioning" shall be understood to include, but not be limited to, signal voltage transformation, filtering, spectrum shaping, current limiting, sampling, processing, conversion, and time delay.

As used herein, the term "FAKRA" refers to one or more standards developed by the DIN (Deutsches Institut für Normung e. V.) group (VDA) which specify inter alia the electrical performance and interface of RF connectors for use in vehicle applications, including without limitation the DIN 72594-1 Standard. See also "USCAR" below, the constituent standards of which also reference FAKRA.

As used herein, the terms "FireWire", "IEEE Std. 1394", or "1394" refer without limitation to IEEE Standards 1394-1995 entitled "High Performance Serial Bus" dated Aug. 30, 1996; 1394a-2000 entitled "High Performance Serial Bus—Amendment 1" dated Jun. 30, 2000; 1394b-2002 entitled "High Performance Serial Bus—Amendment 2" dated Dec. 14, 2002; and/or 1394c-2006 entitled "High Performance Serial Bus—Amendment 2" dated Jun. 8, 2007, each of the foregoing being incorporated herein by reference in its entirety.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, equalizers, UARTs, radio transceivers/chipsets, and other devices, as well as any combinations thereof.

As used herein, the terms "jack" and "connector" refer generally to any interconnection apparatus adapted to transfer signals, power, and/or data across an interface including for example and without limitation (i) modular jacks, as well as (ii) multi-pin or multi-terminal connectors (including e.g., 1394a/b "FireWire" connectors and USB connectors, D-type connectors, etc.), (iii) coaxial connectors, (iv) BNC connectors, (v) ribbon-type connectors, (v) other connectors not specifically identified above.

As used herein, the term "network" refers generally to any system having two or more nodes that is capable of carrying data or other signals and/or power. Examples of networks include, without limitation, LANs (e.g., Ethernet, Gigabit Ethernet, etc.), WLANs, WANs, PANs, MANs, internets (e.g., the Internet), intranets, HFC networks, peer-to-peer (P2P) networks, etc. Such networks may comprise literally any topology (e.g., ring, bar, star, distributed, etc.) and protocols (e.g., ATM, X.25, IEEE 802.3, IP, etc.), whether wired or wireless for all or a portion of their topology. Other examples of a network include peer-to-peer communications systems and/or dongle applications that do not require a dedicated router, server or other device.

As used herein, the terms "USB" and "Universal Serial Bus" refer to a serial bus standard to interface devices to a host computer or other device and include without limitation USB 2.0 entitled "Universal Serial Bus Specification—Revision 2.0" dated Apr. 27, 2000, USB 3.0 entitled "Universal Serial Bus Specification 3.0—Revision 1.0" dated Nov. 12, 2008, and wireless USB including so-called "Wireless USB 1.0" entitled "Wireless Universal Serial Bus Specification—Revision 1.0" dated May 12, 2005, each of the foregoing being incorporated herein by reference in its entirety, and any subsequent versions thereof.

As used herein, the term "USCAR" refers to the standard developed by USCAR (U.S. Council for Automotive Research) which specify inter alia the geometry, electrical performance and interface of RF connectors for use in vehicle applications, including without limitation the SAE/USCAR-17, -18 and -19 Standards, each of the foregoing being incorporated herein by reference in its entirety.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, UMTS, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

The present invention provides, inter alia, connector apparatus that is specifically adapted to allow use of low-cost transmission medium solutions (e.g., cables) for high-speed data applications. In essence, "dirty" signals generated by lower cost cables and interfaces (e.g., connections) can be "cleaned up" before being provided to circuit board components of a connected electronic or client device (including for example the 1394 traces and integrated circuits necessary to support the 1394 protocol), thereby obviating components on the board or otherwise within the host device to perform such clean-up. The total cost of the low-cost medium and the "clean up" circuitry is also advantageously less than that of the POF or twisted shielded pair (TSP) solutions of the prior art.

Accordingly, in one aspect of the present invention, use of a "micro" or "ribbon" type low-cost coaxial cable and standard harness connectors are used. In the exemplary case of automotive applications, cables and connectors that meet widely used and accepted industry standards such as FAKRA, USCAR, etc. are utilized. This approach ensures that the cables/connectors are sufficiently rugged, and can be installed by most if not all OEM facilities.

Similarly, in the aforementioned commercial applications, RG6U and/or RG59 coaxial cable (which is currently used in >80% of home applications for cable and satellite service) can advantageously be employed, thereby obviating specialized and costly cables and rewiring. Such cables and connectors are ubiquitous low-cost products available at any electronic supply store.

Further advantages of this invention include: (i) provides a completely self contained module (signal interface) that is easily adapted to existing platforms/applications without having to invest time and money in a costly redesign and revalidation of a new version of the hardware of the target platform/application; (ii) designed in a manner that lends itself to high-yield, low-cost production techniques; (iii) designed to be compatible with automatic insertion equipment and assembly into the target platform/application; (iv) able to be "keyed" or polarized so as to only allow the correct mating cable to be connected, and multiple "keys" can be made to accommodate systems with multiple cables; and (v) power distribution; can charge and/or power a device akin to existing PoE or power-over-USB solutions (including use of power coils with sufficient inductance to preserve low loading of coaxial conductor, and low parasitic capacitance).

DETAILED DESCRIPTION OF THE EXEMPLARY EMBODIMENTS

Exemplary embodiments of the methods and apparatus of the invention are now described in detail. While discussed primarily in the context of: (i) the IEEE Std. 1394 or "FireWire" standard, and (ii) coaxial cables, it will be recognized that the connector apparatus of the invention may be applied to literally any signal transmission protocol or standard, and/or cabling paradigm. For example, the present invention finds utility in USB (Universal Serial Bus) applications, and Ethernet (e.g., GBE) applications operating in the Gigabit/second transmission rate of the type well known in the art. The invention may be employed in any number of different transmission protocols, interfaces, and cable configurations, including those where noise of other interference otherwise mandates the use of high-cost/high-quality interface components so that such noise or interference is mitigated.

Moreover, while automotive and "commercial" or consumer embodiments are discussed herein, it will be appreciated that any number of different applications may be used consistent with the invention including without limitation government/military, enterprise, and even spacecraft.

Connector and Cable Architecture—

One exemplary embodiment of the invention uses standard connector interfaces (e.g., coaxial) for both automotive and consumer applications. This comprises a connector that is incorporated into the device that provides the ability to take a signal from a coaxial cable and perform necessary signal conditioning. For example, in the case of a 1394 signal, the signal is converted by the device into a bilingual signal that is required to operate the 1394 physical layer (PHY). The connector may be fully shielded and provides the ability to decouple the grounds within the connector for control of EMC/EMI. The connector comprises a 1394b coaxial interface, capable of operation at speeds ranging from s100 to s1000 (or beyond), in a single miniaturized package.

The exemplary design provides for isolation of the case ground (which is part of the RF shield) from the signal ground, thereby reducing or preventing degradation of the signal between two nodes. Having the case also function as an RF shield ensures that any significant EMI/RFI noise from the target application (CD Player, etc) cannot reach the signal and degrade it. Moreover, electrical "noise" from the cables or other external sources is advantageously not able to effect the operation of the target application since, inter alia, the electronic components necessary to implement the interface are shielded.

The shielded case and cover are both physically isolated and electrically decoupled from internal circuitry that equalizes the incoming and outgoing signals. Thus, high-speed applications (such as 1394 or USB) are able to operate over existing cables that were heretofore unable to be used for such applications. This advantageously negates the need to upgrade to new, more expensive cables.

Moreover, the exemplary embodiment of the connector apparatus of the invention, being a wholly self-contained module, residing in a miniaturized package, allows devices such as CD players, radio tuners, amplifiers, etc. to be readily adapted to operation over a 1394b or other high-speed network without a major internal redesign of these devices (i.e., without significant revision or modification to the device motherboard (PCB), component layout, and/or shielding configuration. See, e.g., FIG. 2G discussed subsequently herein.

The advantages to this approach are both technical and monetary. Adaptation of such devices to a network ensures harmonious interoperation of these devices with each other, allowing consumers access to any, or all of these devices at will. Additionally, multiple users are permitted to selectively access these devices in multiple combinations simultaneously. For example, in a first scenario, suppose there are three people located at a premises (e.g., home). One person listens to the ball game on the RF Tuner, while another watches a DVD, and the third listens to a CD. All are simultaneously accessing equipment over a common network without mutual interference and through use of a low cost cabling and connection system. In another scenario, suppose that the foregoing three people are in separate rooms of the home, but now want to watch the same DVD. Though the DVD player is in a separate room, they can all access the same device simultaneously.

FIG. 1 illustrates various views of a first embodiment of the connector apparatus 100 according to the invention. In this embodiment, a coaxial connector 102 is used in conjunction with a housing 104 formed form e.g., a polymer (such as an injection molded plastic), an internal component substrate 106 (e.g., PCB, such as an FR-4 type), a through-hole mount terminal set 108 that mates to the substrate, a plurality of electronic components (e.g., integrated circuit, described below, and discrete components such as chip capacitors, resistors, power coils, etc.) 110, and a noise shield (e.g., Faraday shield) 113. The housing 104 also comprises a snap-on cover 114, the cover and/or housing which may also be adapted if desired to engage a housing or other such component (not shown) of a parent electronic device (e.g., radio, CD player, PMD, client device, etc.) so as to provide enhanced mechanical stability and robustness for the coaxial connector apparatus 100.

It will be recognized that while the illustrated embodiment of the apparatus 100 assumes pin-through-paste and reflow, a wave solder approach of the type well known in the electronic arts (or yet other techniques) may be used as well.

Moreover, while the illustrated embodiment is configured for pin/through-hole mounting to its parent substrate (e.g., motherboard of the electronic device) so as to provide an attachment that is mechanically robust in order to withstand attachment of the coaxial cable to the connector, the connector may utilize other mounting techniques whether in place of or in combination with the aforementioned through-hole mounting. For example, one variant of the connector replaces the six (6) terminals 108 of FIG. 1 with a comparable number of surface mount technology (SMT) terminals of the type well known in the art. Moreover, the physical strength of the assembly (i.e., connector mounted onto a substrate) can be enhanced through the use of other mechanical support methods such as e.g., mechanical pins formed on the connector housing that cooperate with holes in the substrate when the two are mated, such as via friction fit, heat staking, adhesives, or other well known approaches.

In another embodiment, as few as three (3) terminals 108 can be used to provide the necessary connector functions. For example in one variant, three terminals (transmit, receive, and ground) are used.

The components and assembly process of this embodiment of the connector apparatus 100 are described in greater detail with respect to FIGS. 3A-3D herein.

The coaxial connector 102 of the apparatus 100 of FIG. 1 can be any type of coaxial arrangement, including in one variant a so-called "micro" coaxial cable adapted for small size (such as those offered by Micro-Coax Corporation of Pottstown, Pa., USA). In another variant, a "ribbon" coax connector is used (such as the Ribbon Micro Gage Coax Assembly offered by Meritec Corporation of Painesville, Ohio, USA).

Figure 2A:
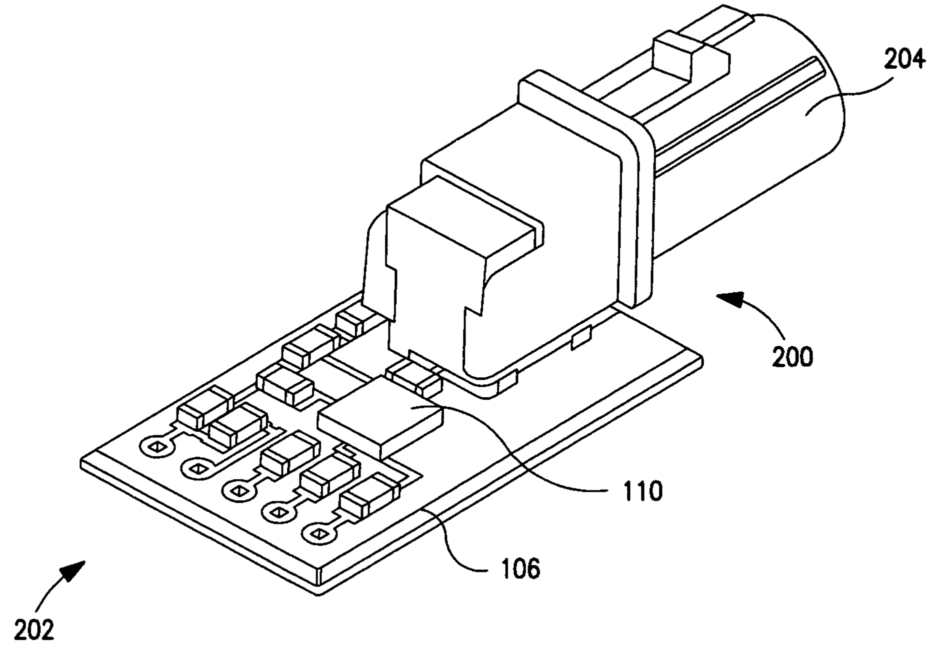
FIG. 2A is a top perspective view (rear) of another embodiment of the connector apparatus of the invention.
Figure 2B:
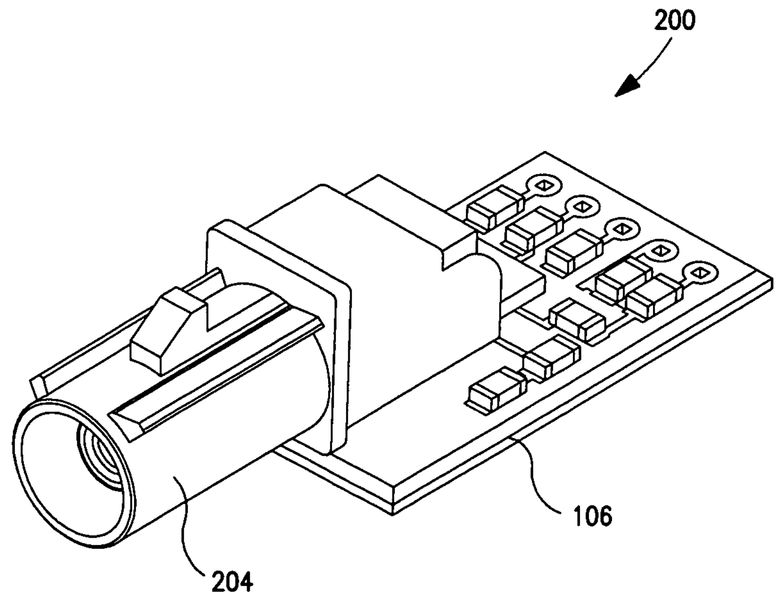
FIG. 2B is a top perspective view (front) of the connector apparatus of FIG. 2A.

FIGS. 2A-2B illustrate another embodiment of the connector apparatus 200. In this embodiment, the connector 200 utilizes a pre-assembled interface module 202 and coaxial connector 204 (e.g., USCAR-FAKRA compliant). The module can be installed into any 1394 application. FIGS. 2A-2B illustrate the device 200 with its external housing and noise shield removed for clarity; the shield (not shown) comprises a stamped one-piece tin alloy shield in one variant. Alternatively, the shield may comprise a multi-component structure, or as yet other variants be: (i) vapor deposited or (ii) plated onto the connector housing.

In one variant, the shield, coating or plating is disposed on the outer surfaces of the connector housing. In another variant, the shield is contained within the interior of the housing (e.g., such as where the coating is plated or deposited on the inside surfaces of the housing. In another embodiment, the shield comprises the housing; e.g., through the use of a metal-impregnated material for the housing.

Figure 2C:
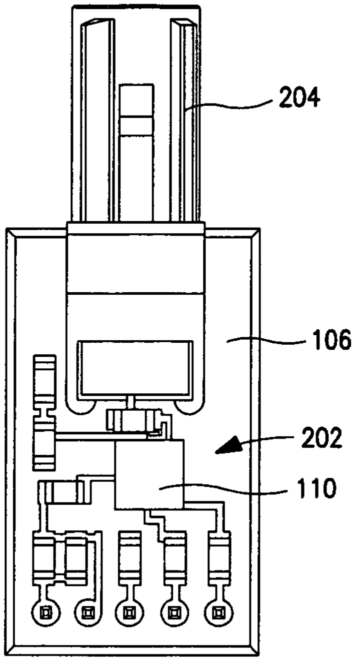
FIGS. 2C-2E are top, bottom and side elevation views, respectively, of the connector apparatus of FIG. 2A.
Figure 2D:
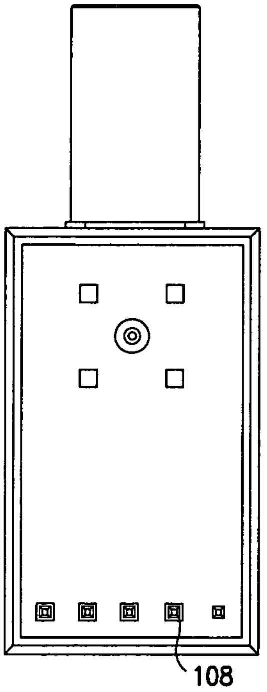
Figure 2E:
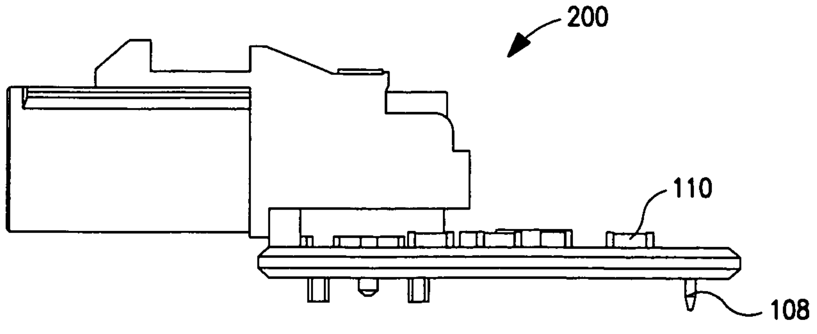

FIGS. 2C, 2D and 2E illustrate various views of the components of the connector apparatus 200 of FIG. 2A. In the illustrated embodiment, the integrated circuit 212 used in the connector apparatus 200 comprises an equalizer circuit adapted to perform spectral shaping and/or filtering, such as the EQCO800SC single 1394b transceiver (coaxial), or corresponding devices for other interface types, manufactured by EqcoLogic NV of Brussels, Belgium, although it will be recognized that other devices may be used with equal success. This example device acts as a bi-directional transceiver for NRZ encoded signals. Cable attenuation as a function of frequency is also substantially normalized (equalized) by this device, thereby providing an effectively "flat" attenuation curve versus frequency for the interface. This flat curve is also substantially gain independent; i.e., independent of the transmit amplitude of the line source.

Necessary interface and support circuitry for the IC(s) (e.g., capacitors, resistors, etc.) are also provided within the connector apparatus as shown.

In another embodiment, the connector apparatus comprises other types of circuitry (whether in place of or in conjunction with the aforementioned equalizer device) such as e.g., one or more echo cancellers, amplifiers, filters, choke coils (inductive reactors), wireless transceivers, UARTs, microcontrollers, or storage devices (e.g., memory).

In the illustrated embodiment of FIG. 2A et seq., an RG174 (2 mm "mini coax") cable/connector is utilized, and provides a typical performance on the order of S100-S400 (at 20 m) and S800 at 15 m.

Figure 2F:
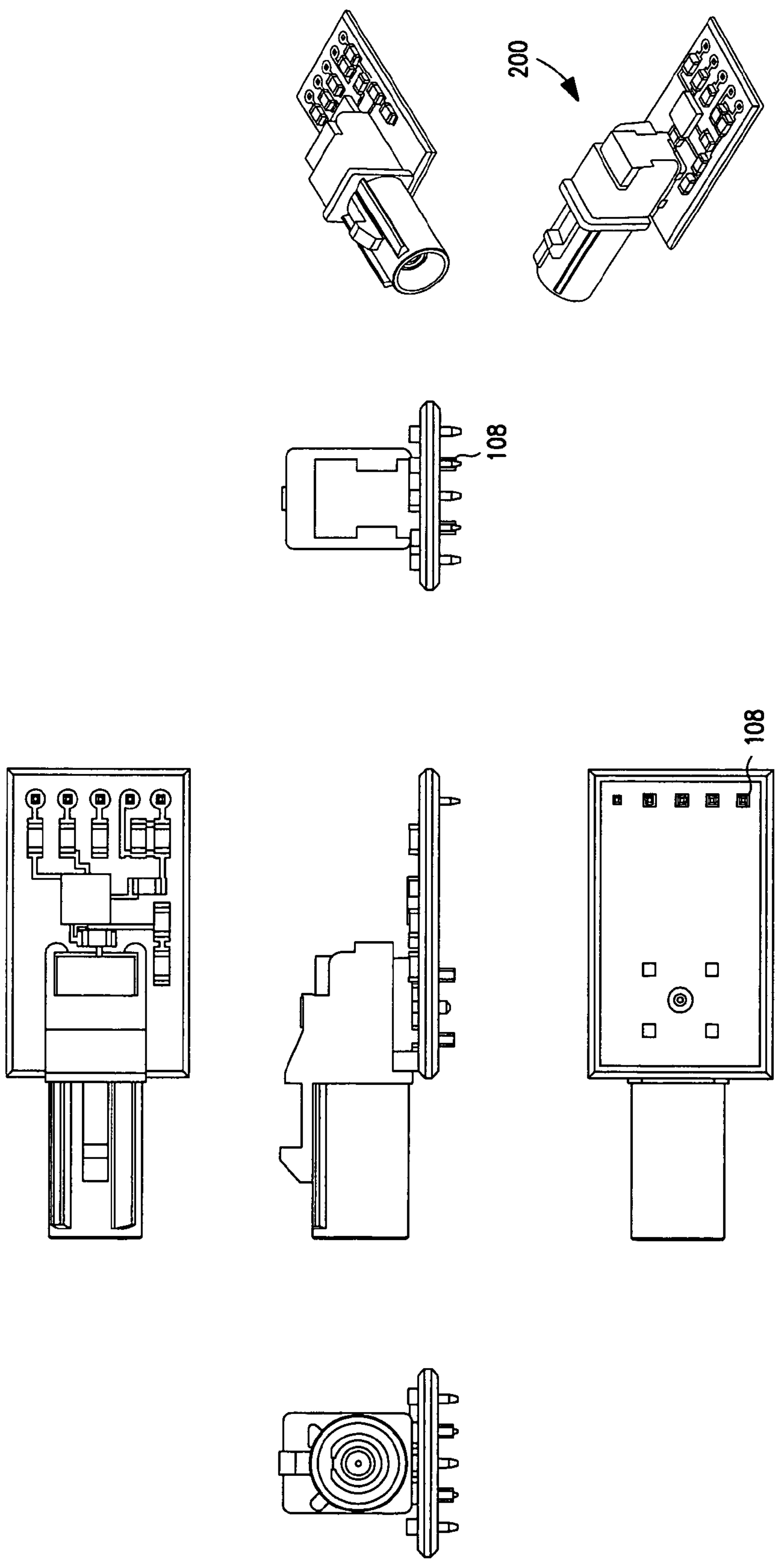
FIG. 2F is a composite view of the connector apparatus of FIG. 2A, showing various dimensions and views thereof.
Figure 2G:
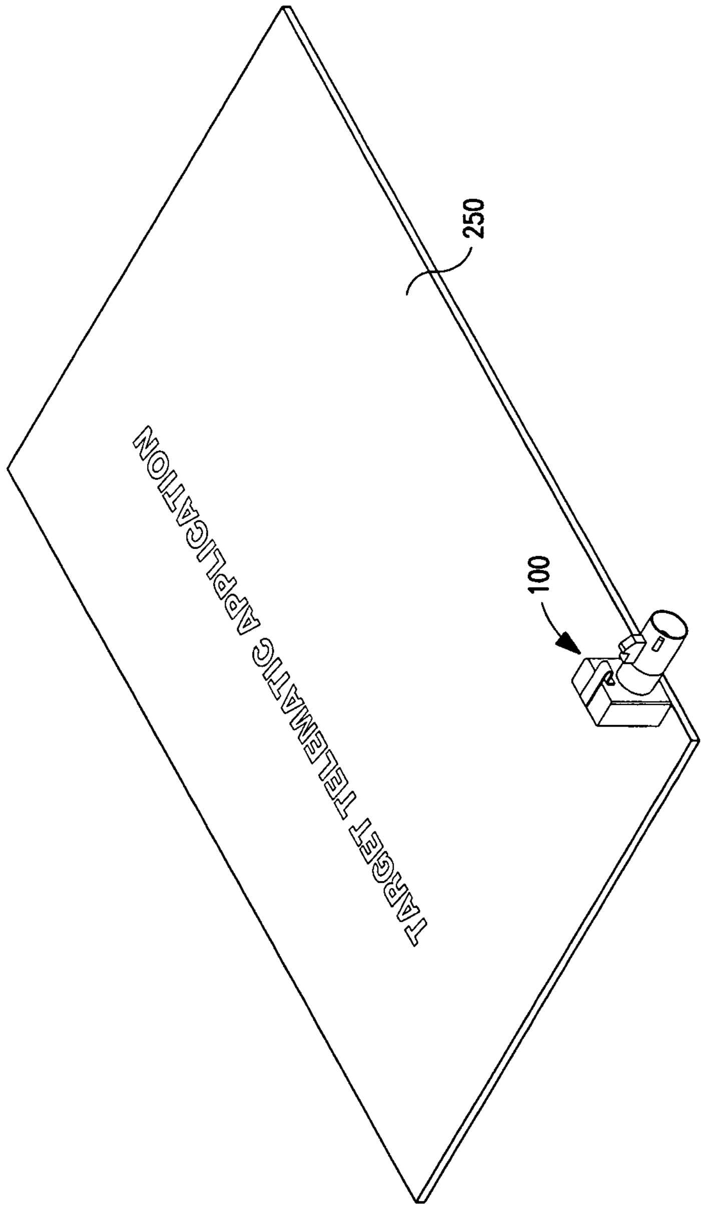
FIG. 2G is a top perspective view of the connector apparatus of FIG. 2A disposed on a typical parent substrate (e.g., target application), showing the relative sizing of the components thereof.

FIG. 2F shows various views of the exemplary connector 200 of FIG. 2A et seq. FIG. 2G illustrates the relative footprint of the exemplary connector of FIG. 2A in relation to a typical PCB 250 (125 mm×200 mm) or client device motherboard. This shows the comparatively small size of the portion of the typical PCB 250 that is required to accommodate the connector apparatus 200.

Method of Manufacture—

Referring to FIGS. 3A-3D, an exemplary embodiment of the method for manufacturing the exemplary connector of the present invention is now described in detail.

It will be recognized that while the following description is cast in terms of the device 100 of FIG. 1, the method is generally applicable to the various other configurations and embodiments of connector apparatus disclosed herein with proper adaptation, such adaptation being within the possession of those of ordinary skill in the electrical device manufacturing field.

Figure 3A:
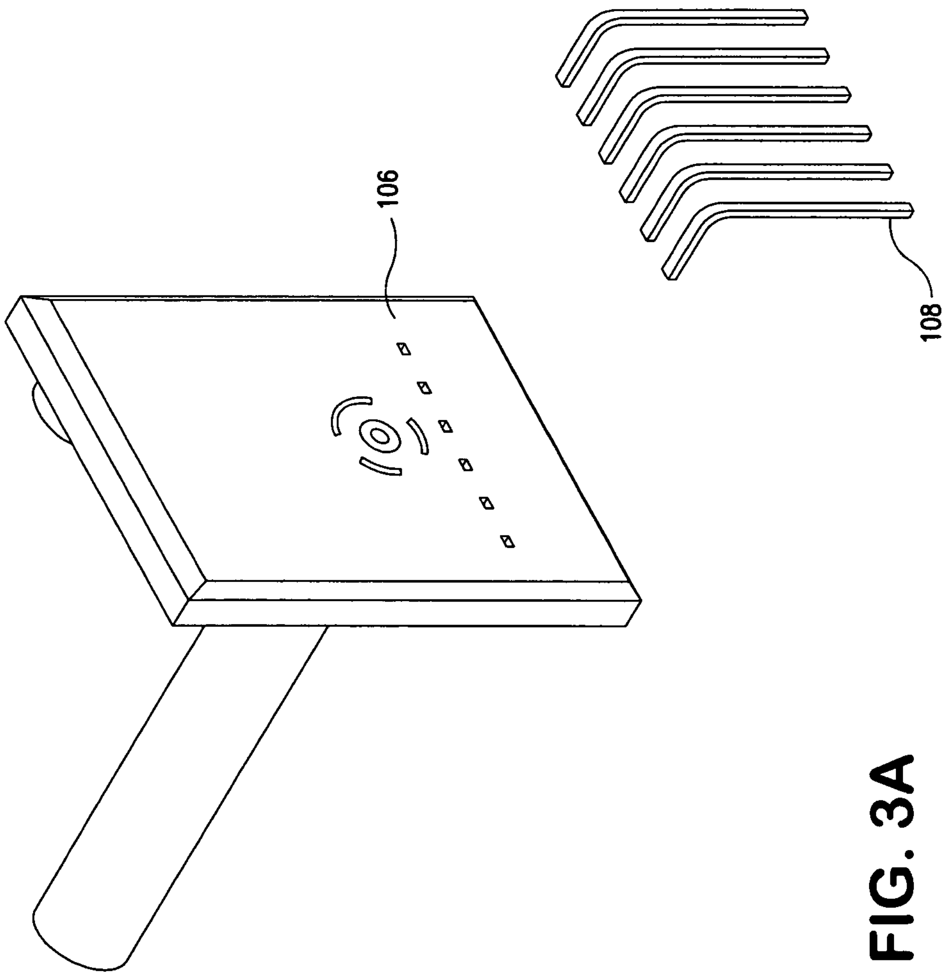
FIGS. 3A-3D are exploded perspective views of the connector apparatus of FIG. 1, showing the various components thereof and exemplary methodology of assembling.

Referring to FIG. 3A, the first step comprises inserting the terminals 108 (e.g., 6 terminals) into a substrate (e.g., PCB) 106. Next, the substrate array is flipped (inverted) if needed. Such terminals may comprise, for example, the continuous pin Autolead™ terminals manufactured by the Assignee hereof that are "bent" to shape in an insertion head. In the illustrated embodiment, six (6) terminals are shown, although it will be appreciated that other numbers of terminals may be used consistent with the invention; e.g., as few as three (3) terminals as previously discussed, such as where certain terminals are not required.

Figure 3B:
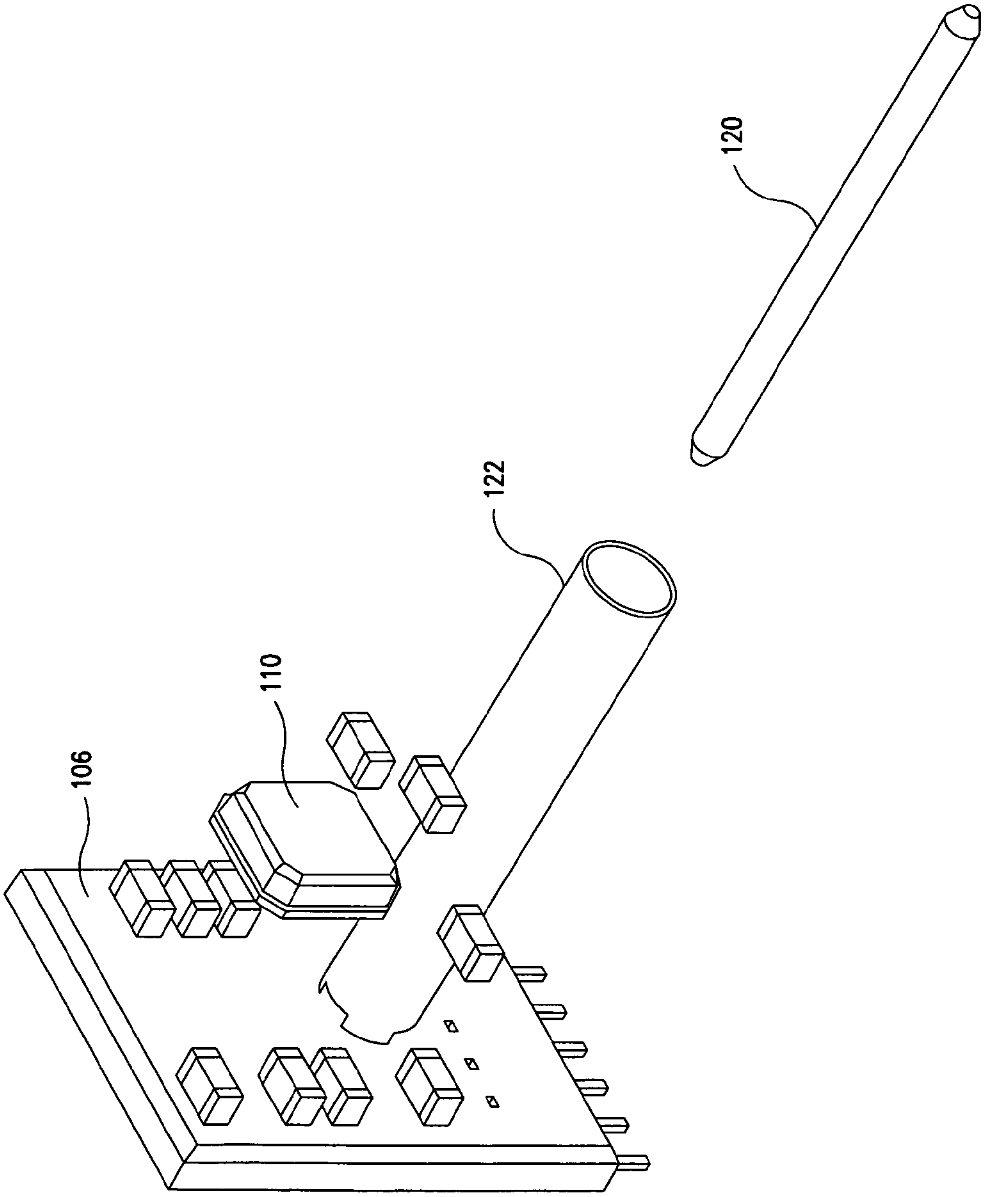

Next, solder paste is applied as needed to form mechanical and/or electrical joints. As shown in FIG. 3B, the method next comprises inserting the integrated circuit(s) (e.g., exemplary equalizer chip), and then inserting n (n=8 in this example) chip capacitors. Next, m (m=2 in this example) 1% chip resistors are inserted. Subsequently, one or more signal pins 120 are inserted, and the coaxial ground 122 inserted. The completed circuit assembly is then reflowed, tested, and singulated as necessary.

Figure 3C:
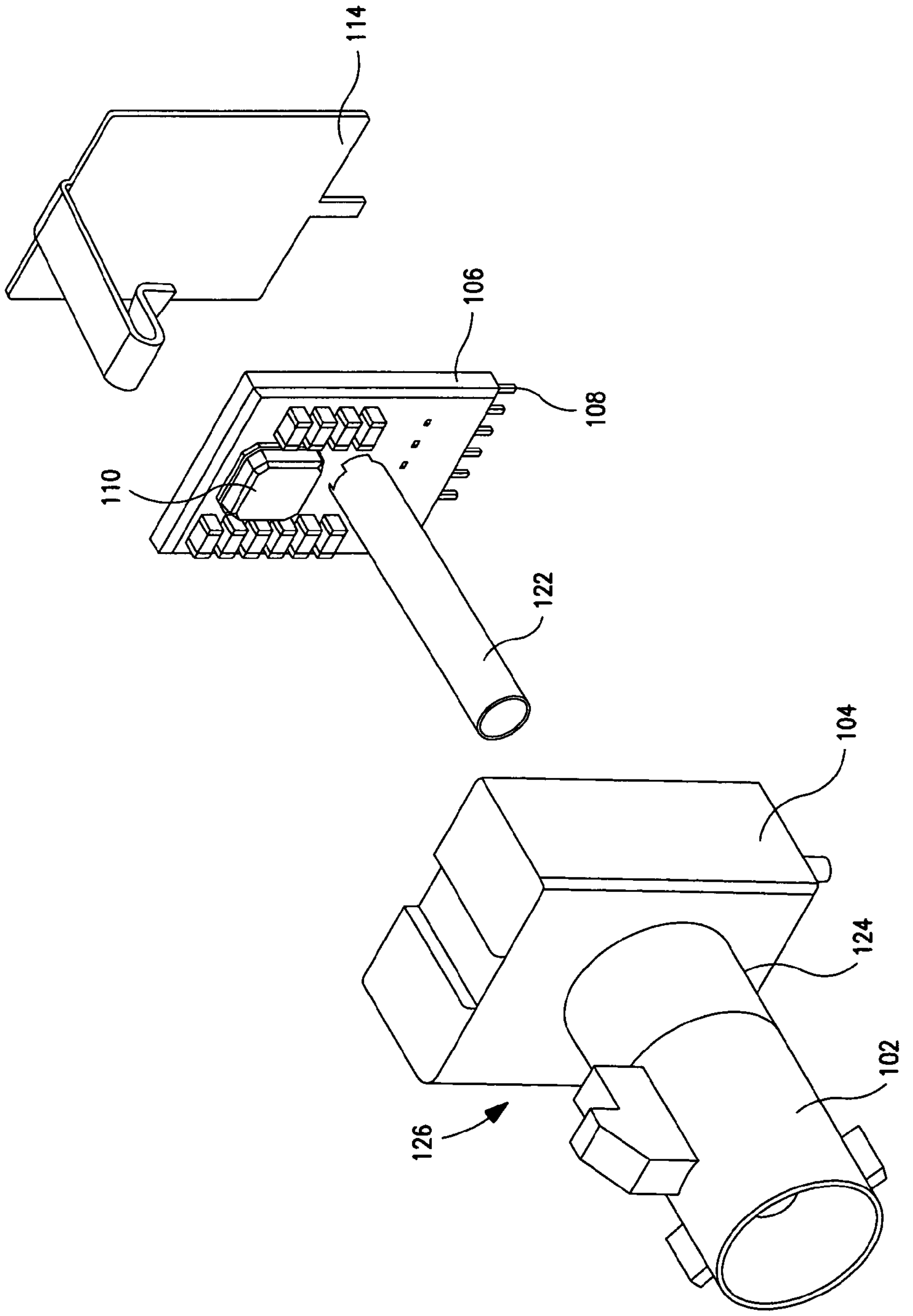
Figure 3D:
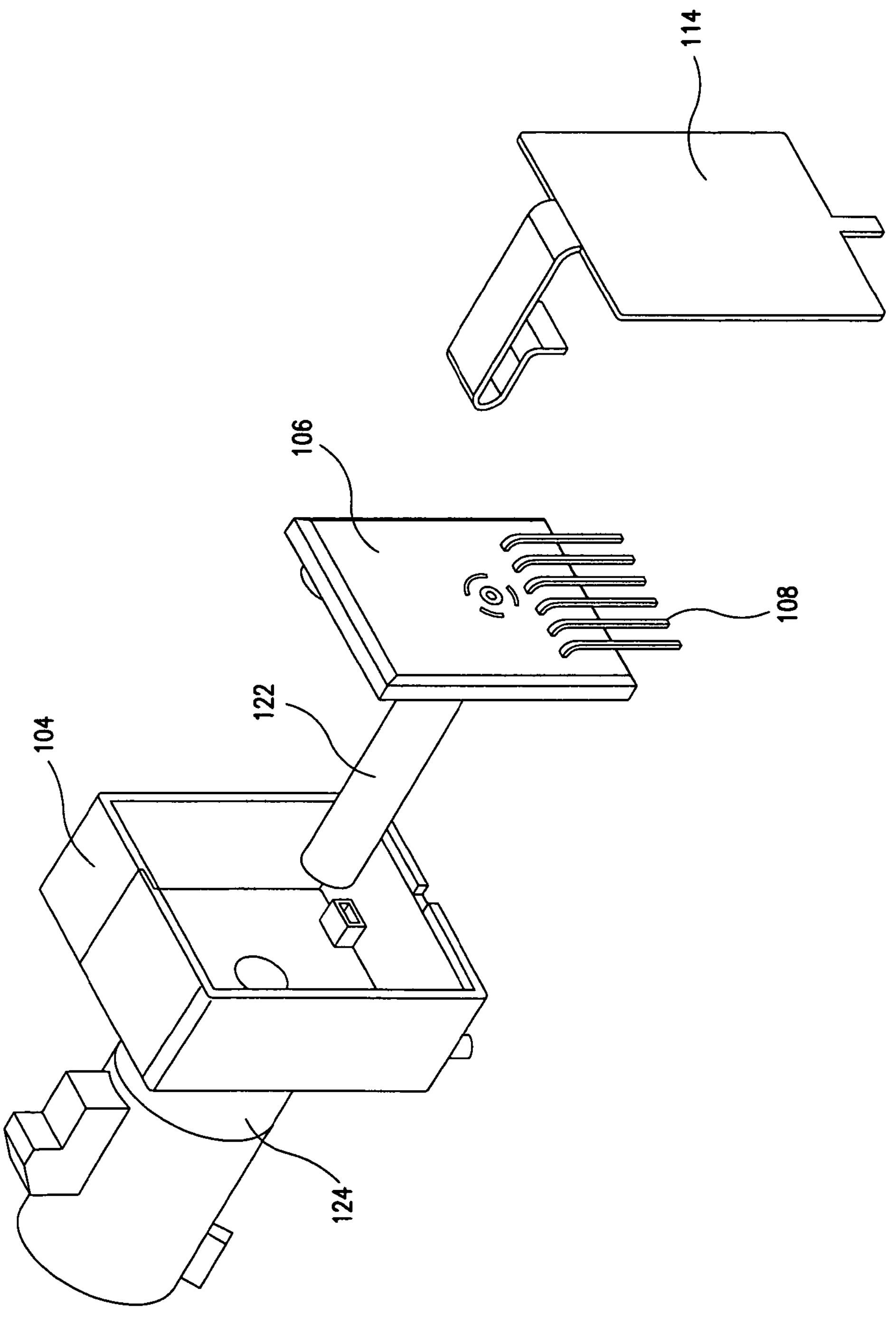

As shown in FIGS. 3C-3D, the assembly process continues with application of a color band 124 (if used) to the housing "snout" 126. The completed circuit assembly is then inserted and fastened, and an optional potting compound (e.g., poured resin) added so as to seal the assembly and protect it against shock, vibration, moisture, etc. Alternatively, a conformal coating (e.g., silicone compound or the like of the type well known in the electronic arts) may be used. The rear cover 114 is then installed as shown.

The final assembled connector may be set into reusable trays for pick and place machines, or otherwise packed or stored.

OTHER EMBODIMENTS

Figure 4:
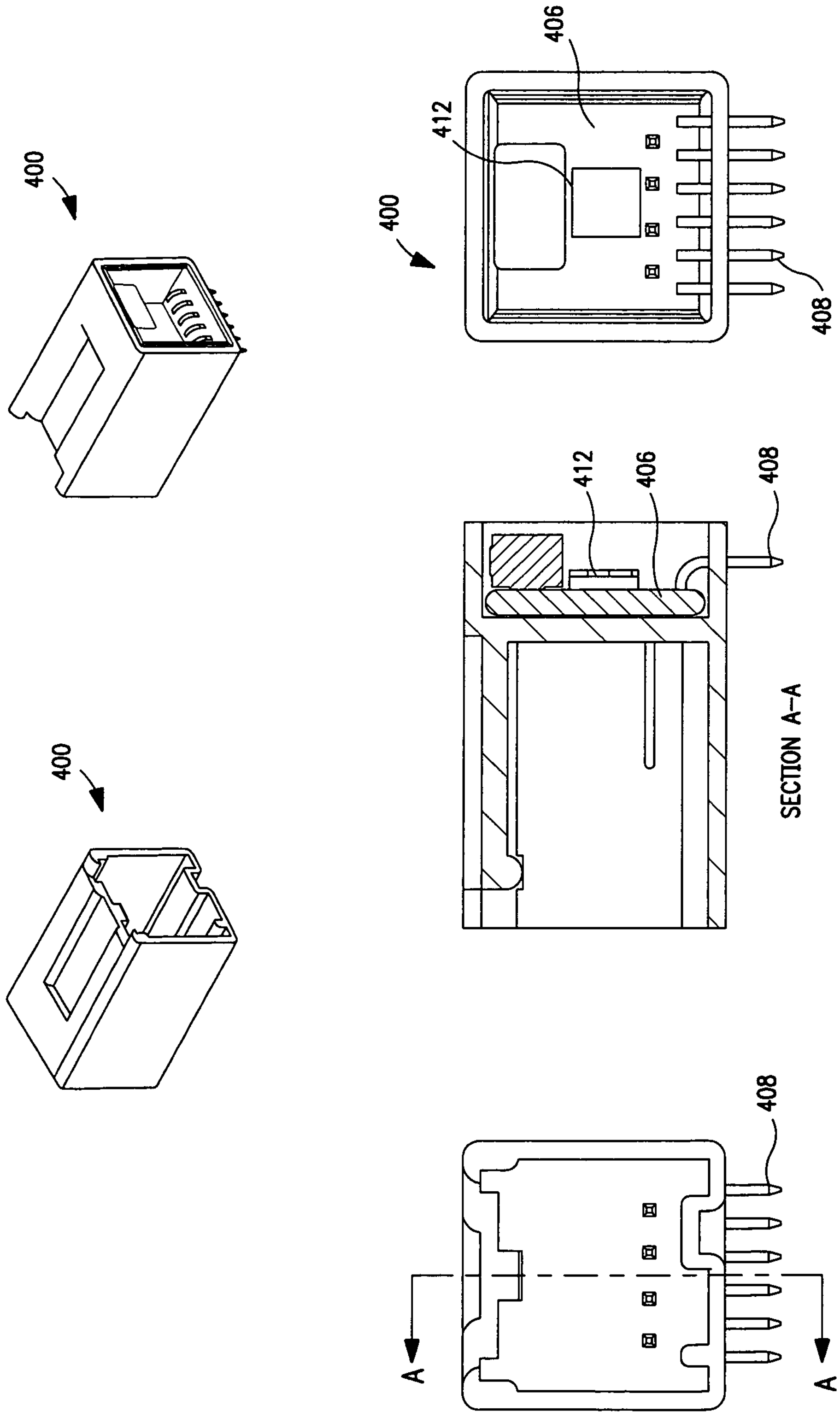
FIG. 4 is a composite view of yet another embodiment of the connector apparatus of the present invention.

Referring now to FIG. 4, yet another embodiment of the connector apparatus is illustrated. A "header" or male connector 400 is created by inserting terminals 408 into a PCB 406 to mate with a mating connector (not shown) connected to the wiring harness. The header body 410 has two open ends and an internal substrate 408 with circuit components 412 mounted thereon. A shield (not shown) is also used over or integral with the connector 400. This connector is shown as an exemplary FireWire 4-pin connector form-factor, but may take on any number of other forms and pin configurations well known to those of ordinary skill in the signal transfer arts.

In another embodiment of the invention, the connector apparatus comprises a modular jack type connector (e.g., RJ45 or the like) that is used in conjunction with a twisted shielded pair (TSP) cable of the type well known in the art. As previously discussed, twisted shielded quad (TSQ) or other high-end cabling is required under the prior art to mitigate noise interference in certain high-speed data applications or protocols such as Ethernet, TDMA, CDMA, MPEG video (e.g., MPEG2), HDMI, and so forth. For example, in the context of the aforementioned dual twisted pair concept, an existing USCAR connector, or an existing RJ45 connector, could be used. Moreover, additional noise mitigation components and even host device redesign are required since electronic components associated with the prior art signal interface are not shielded.

In contrast, the present embodiment of the invention provides support for the aforementioned high-speed signal protocols through use of an equalizer or signal conditioning IC adapted for use with such protocols. For example, a counterpart to the aforementioned EQCO800SC single 1394b transceiver that is adapted for 802.3 or other such applications contained within a shielded connector (not shown) can be employed in conjunction with a TSP cable (contrast, TSQ), thereby advantageously: (i) obviating use of the more expensive TSQ cable, and (ii) obviating any significant redesign or added shielding within the host device.

In yet another embodiment, a "copy one generation" enabled integrated circuit (e.g., one implementing DTCP or Digital Transmission Content Protection standards such as "Digital Transmission Content Protection Specification" Revision 1.51 (Informational Version) dated Oct. 1, 2007, which is incorporated herein by reference in its entirety) such as the Matsushita IEEE 1394 single chip LSI (MN864501), or the Sony CXD-3204 or CXD-3205 IEEE-1394 chips, is included within the connector apparatus, so as to implement copy one generation or similar digital rights management (DRM) processing within the connector itself, thereby obviating such circuitry on a host device with which the connector is used. In this fashion, an absolute minimum of adaptation of the host device if any (i.e., only for the connector) is required while still allowing the implementation of DRM such as copy one generation.

In yet another embodiment, the connector (and associated signal interface) further comprise a power delivery capability (whether supply or receipt, depending on the host device configuration). For example, in the context of an Ethernet (802.3) interface, the connector apparatus might include an Ethernet equalizer adapted for TSP (if required), as well as an 802.3af (PoE or power-over-Ethernet, as set forth in IEEE Std. 802.3-2005 entitled "Information technology—Telecommunications and information exchange between systems—Local and metropolitan area networks—Specific requirements—Part 3: Carrier Sense Multiple Access with Collision Detection (CSMA/CD) access method and physical layer specifications", which is incorporated herein by reference in its entirety) controller within the shielded volume.

It will further be appreciated that the connector apparatus of the present invention may also advantageously be configured as an adapter or "dongle". Specifically, rather than mate directly with a host device internal component (e.g., motherboard), the connector apparatus may be configured to mate with an existing connector (e.g., FireWire 4-pin or 6-pin connector) as well as with another connector type (e.g., the aforementioned coaxial connector). Hence, the connector apparatus and its internal circuitry act as an interface between the interface cable and the host device, without requiring any modification or changes to the host. By inserting the connector apparatus into the existing connector receptacle on the host device, and then mating up the cable to the connector (or vice versa), the equalization (and/or other) circuitry within the connector apparatus is placed in line within the circuit, and still substantially shielded (with the exception of the connecting terminal runs between the connector apparatus and the existing host device connector terminals). Moreover, a lower-cost/performance cable system can be used as previously described.

The adapter can also optionally be configured to mate or interact with the housing or other features of the host device (including the existing connector itself) so as to add mechanical rigidity and robustness, since the adapter will necessarily have some length and hence added (undesired) mechanical advantage on the existing connector. In one variant, this feature comprises a shroud or fairing around the adapter that projects toward the existing connector so as to stabilize the connector against the side of the host device housing around the existing connector. Various other mechanisms for accomplishing the goal of enhanced stability/robustness will be appreciated by those of ordinary skill given the present disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. For example, while the invention has been disclosed in terms of a component for telecommunications and networking applications, the inductive device architecture of the present invention could be used in other applications such as specialized power transformers. The foregoing description is of the best mode presently contemplated of carrying out the invention. This description is in no way meant to be limiting, but rather should be taken as illustrative of the general principles of the invention. The scope of the invention should be determined with reference to, inter alia, the claims.

APPENDIX I

Exemplary Coaxial Cable/Connector Types

| Designation | Approx. Impedance [Ohms] | Core Size | Dielectric type | Dielectric [in] | Dielectric [mm] | Overall Diameter [in] | Overall Diameter [mm] | Velocity Factor |
|---|---|---|---|---|---|---|---|---|
| RG-6/U | 75 | 1.0 mm | PE | 0.185 | 4.7 | 0.332 | 8.4 | |
| RG-6/UQ | 75 | | PE | | | 0.298 | 7.62 | |
| RG-8/U | 50 | 2.17 mm | PE | 0.285 | 7.2 | 0.405 | 10.3 | |
| RG-9/U | 51 | | PE | | | 0.420 | 10.7 | |
| RG-11/U | 75 | 1.63 mm | PE | 0.285 | 7.2 | 0.412 | 10.5 | 0.66 |
| RG-58/U | 50 | 0.9 mm | PE | 0.116 | 2.9 | 0.195 | 5.0 | 0.66 |
| RG-59/U | 75 | 0.81 mm | PE | 0.146 | 3.7 | 0.242 | 6.1 | 0.66 |
| RG-62/U | 92 | | PE | | | 0.242 | 6.1 | 0.84 |
| RG-62A | 93 | | ASP | | | 0.242 | 6.1 | |
| RG-174/U | 50 | 0.48 mm | PE | 0.100 | 2.5 | 0.100 | 2.55 | |
| RG-178/U | 50 | 7 × 0.1 mm Ag plated Cu clad Steel | PTFE | 0.033 | 0.84 | 0.071 | 1.8 | 0.69 |
| RG-179/U | 75 | 7 × 0.1 mm Ag plated Cu | PTFE | 0.063 | 1.6 | 0.098 | 2.5 | 0.67 |
| RG-213/U | 50 | 7 × 0.0296 in Cu | PE | 0.285 | 7.2 | 0.405 | 10.3 | 0.66 |
| RG-214 | 50 | | | | | 0.406 | 10.8 | |
| RG-218 | 50 | 0.195 in Cu | PE | 0.660 (0.680) | 16.76 (17.27) | 0.870 | 22 | 0.66 |
| RG-223 | 50 | 2.74 mm | FE | .285 | 7.24 | .405 | 10.29 | |
| RG-316/U | 50 | 7 × 0.0067 in | PTFE | 0.060 | 1.5 | 0.102 | 2.6 | |
| BNC | 50, 75 | | | | | | | |
| SMA | 50 | | | | | | | |

APPENDIX I-continued

Exemplary Coaxial Cable/Connector Types

| Designation | Approx. Impedance [Ohms] | Core Size | Dielectric type | Dielectric [in] | Dielectric [mm] | Overall Diameter [in] | Overall Diameter [mm] | Velocity Factor |
|---|---|---|---|---|---|---|---|---|
| FAKRA | 50 | | | | | | | |
| H155 | 50Ω | | | | | | | 0.79 |
| H500 | 50Ω | | | | | | | 0.82 |
| LMR-195 | 50Ω | | | | | | | |
| LMR-200 | 50Ω | 1.12 mm Cu | PF | 0.116 | 2.95 | 0.195 | 4.95 | 0.83 |
| HDF-200 | | | CF | | | | | |
| CFD-200 | | | | | | | | |
| LMR-400 | 50Ω | 2.74 mm | PF | 0.285 | 7.24 | 0.405 | 10.29 | 0.85 |
| HDF-400 | | (Cu clad Al) | CF | | | | | |
| CFD-400 | | | | | | | | |
| LMR-600 | 50Ω | 4.47 mm (Cu clad Al) | PF | 0.455 | 11.56 | 0.590 | 14.99 | 0.87 |
| LMR-900 | 50Ω | 6.65 mm (BC tube) | PF | 0.680 | 17.27 | 0.870 | 22.10 | 0.87 |
| LMR-1200 | 50Ω | 8.86 mm (BC tube) | PF | 0.920 | 23.37 | 1.200 | 30.48 | 0.88 |
| LMR-1700 | 50Ω | 13.39 mm (BC tube) | PF | 1.350 | 34.29 | 1.670 | 42.42 | 0.89 |

What is claimed is:

1. A shielded connector adapted for mating with a coaxial cable and adapted for providing a high-speed signal interface between said cable and an electronic device, said connector comprising:

a coaxial cable connector;

a connector housing comprising a noise shield and a substantially shielded volume formed therein; and an integrated circuit comprising an equalizer circuit configured to substantially normalize cable attenuation as a function of frequency, said integrated circuit being in signal communication with said connector and disposed substantially within said shielded volume;

wherein said shield is adapted to mitigate at least noise radiated from said integrated circuit and at least one other electronic component disposed within said shielded volume; and wherein said shielded connector comprises a self-contained module configured to couple to a printed circuit board (PCB) of said electronic device.

2. The shielded connector of claim 1, wherein said equalizer circuit is configured to perform at least spectral shaping.

3. The shielded connector of claim 2, wherein said integrated circuit further comprises a power circuit that is configured to perform a power distribution function.

4. The shielded connector of claim 2, wherein said integrated circuit is configured to perform signal filtering.

5. The shielded connector of claim 1, wherein said coaxial connector comprises a coaxial connector comprising a ribbon-type coaxial cable.

6. The shielded connector of claim 1, wherein said noise shield is formed using a plating or vapor deposition process.

7. The shielded connector of claim 1, wherein the high-speed signal interface comprises a high speed serialized bus protocol.

8. A shielded connector adapted for mating with a conductor and adapted for providing a high-speed signal interface between said conductor and an electronic device on an automobile, said connector comprising:

a conductor connector;

a connector housing comprising a noise shield and a substantially shielded volume formed therein; and an integrated circuit comprising an equalizer circuit in signal communication with said conductor connector and disposed substantially within said shielded volume;

wherein said shield comprises a case ground isolated from a signal ground and is configured to mitigate at least noise radiated from said integrated circuit and at least one other electronic component disposed within said shielded volume.

9. The shielded connector of claim 8, wherein said integrated circuit comprises an equalizer circuit configured to perform at least spectral shaping.

10. The shielded connector of claim 8, wherein said integrated circuit is further configured to perform signal filtering.

11. The shielded connector of claim 10, wherein said conductor connector further comprises a coaxial connector comprising a ribbon-type coaxial cable.

12. The shielded connector of claim 8, wherein said noise shield is formed using a plating or vapor deposition process.

13. The shielded connector of claim 8, wherein said integrated circuit further comprises a power circuit configured to perform a power distribution function.

14. A shielded connection apparatus adapted for mating with a signal conduction means and adapted for providing a high-speed signal interface between said conduction means and an electronic device, said connector comprising:

a signal conduction means connector;

a connector housing comprising a noise shield and a substantially shielded volume formed therein; and an integrated circuit comprising an equalizer circuit configured to perform a filtering function, said integrated circuit in signal communication with said signal conduction means connector and disposed substantially within said shielded volume and at least one power coil, said at least one power coil configured to power said electronic device via said signal conduction means;

wherein said shield is adapted to mitigate at least noise radiated from said integrated circuit and at least one other electronic component disposed within said shielded volume.

15. The shielded connection apparatus of claim 14, wherein said equalizer circuit is further configured to perform spectral shaping.

16. The shielded connection apparatus of claim 14, wherein said signal conduction means connector comprises a coaxial connector for use with a ribbon-type coaxial cable.

17. The shielded connection apparatus of claim 14, wherein said noise shield is formed using a plating or vapor deposition process.

* * * * *